United States Patent [19]
Kovacs et al.

[11] Patent Number: 5,444,463
[45] Date of Patent: Aug. 22, 1995

[54] COLOR XEROGRAPHIC PRINTING SYSTEM WITH DUAL WAVELENGTH, SINGLE OPTICAL SYSTEM ROS AND DUAL LAYER PHOTORECEPTOR

[75] Inventors: Gregory J. Kovacs, Sunnyvale; G. A. Neville Connell, Cupertino, both of Calif.

[73] Assignee: Xerox Corporation, Stamford, Conn.

[21] Appl. No.: 987,886

[22] Filed: Dec. 9, 1992

[51] Int. Cl.⁶ .................. G01D 15/06; G01D 15/14
[52] U.S. Cl. .................. 347/118; 347/134; 347/140
[58] Field of Search ............ 430/54, 57, 58, 59; 346/160, 108, 107 R, 157, 135.1

[56] References Cited

U.S. PATENT DOCUMENTS

| | | | |
|---|---|---|---|
| 4,392,737 | 7/1983 | Nishikawa | 430/54 X |
| 4,433,038 | 2/1984 | Nishikawa | 430/55 |
| 4,440,843 | 3/1984 | Nishikawa | 430/55 |
| 4,440,844 | 3/1984 | Nishikawa | 430/55 |
| 4,442,191 | 3/1984 | Nishikawa | 430/55 |
| 4,445,126 | 4/1984 | Tsukada | 346/108 |
| 4,521,504 | 6/1985 | Sakuma et al. | 430/57 |
| 4,728,983 | 3/1988 | Zwadlo et al. | 355/4 |
| 4,839,692 | 6/1989 | Shoji et al. | 355/211 |
| 4,977,417 | 12/1990 | Takanashi et al. | 346/160 |
| 5,006,868 | 4/1991 | Kinoshita | 346/157 |
| 5,089,908 | 2/1992 | Jodoin et al. | 346/108 X |
| 5,164,276 | 11/1992 | Robinson et al. | 430/59 |
| 5,187,036 | 2/1993 | Matsui et al. | 430/59 |

*Primary Examiner*—Joseph W. Hartary
*Assistant Examiner*—Randy W. Gibson
*Attorney, Agent, or Firm*—William Propp

[57] ABSTRACT

A single pass color xerographic printing system with a single polygon, single optical system Raster Output Scanning (ROS) system has a dual wavelength laser diode source for the ROS which images the dual beams at a single station as closely spaced spots on a dual layer photoreceptor with each photoreceptor layer sensitive to or accessible by only one of the two wavelengths.

18 Claims, 4 Drawing Sheets

COLOR XEROGRAPHIC PRINTING SYSTEM WITH DUAL WAVELENGTH, SINGLE OPTICAL SYSTEM ROS AND DUAL LAYER PHOTORECEPTOR

CROSS-REFERENCE TO RELATED APPLICATIONS

This application contains subject matter that is related to subject matter of patent application Ser. No. 07/987,885, filed Dec. 9, 1992, and patent application Ser. No. 08/000,349, filed Jan. 4, 1993, both assigned to the same assignee herein.

BACKGROUND OF THE INVENTION

This invention relates to a single pass color xerographic printing system with a single polygon, single optical system Raster Output Scanning (ROS) system, and, more particularly, to a dual wavelength laser diode source for the ROS which images the dual beams at a single station as closely spaced spots on a dual layer photoreceptor with each photoreceptor layer sensitive to only one of the two wavelengths or with one photoreceptor layer sensitive to both wavelengths and located beneath the other layer which absorbs one of the two wavelengths and permits only the second wavelength of light to reach the lower layer. Hence, although sensitive to both wavelengths the lower layer is only accessed by one of the two wavelengths.

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image, onto a recording medium, usually plain paper. While other methods are known, the most common method of sweeping the laser beam is to deflect it from a rotating mirror. A multifaceted, rotating polygon mirror having a set of related optics can sweep the beam or sweep several beams simultaneously. Rotating polygon mirrors and their related optics are so common that they are generically referred to as ROSs (Raster Output Scanners), while printers that sweep several beams simultaneously are referred to as multispot printers.

When a xerographic printer prints in two or more colors, it requires a separate latent image for each color printed, called a system color. Color prints are currently produced by sequentially transferring overlapped images of each system color onto an intermediate transfer belt that is passed multiple times, once for each system color, over the photoreceptor. The built-up image is then transferred to a single recording medium and fused. Such printers are called multiple pass printers.

Conceptually, one can build up multiple colors on a photoreceptor or intermediate transfer belt that is passed through the system only once, in a single pass, by using a sequence of multiple xerographic stations, one for each system color. The built-up image on the photoreceptor or ITB can be transferred to a recording medium in a single pass. Additionally, tandem xerographic stations can sequentially transfer images directly to the recording medium in a single pass. Such a printer, called a multistation printer, would have a greater output than a multipass printer operating at the same raster sweep speed because the rasters for each color are operating simultaneously in the single pass printer. However, the introduction of multistation printers has been delayed by 1) cost problems, at least partially related to the cost of multiple xerographic stations and the associated ROSs, and 2) image quality problems, at least partially related to the difficulty of producing similar spots at each imaging station and subsequently registering (overlapping) the latent images on the photoreceptors, transfer mediums or recording mediums.

In the practice of conventional bi-level xerography, it is the general procedure to form electrostatic latent images on a xerographic surface by first uniformly charging a charge retentive surface such as a photoreceptor. The charged area is selectively dissipated in accordance with a pattern of activating radiation corresponding to desired images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

Modern business and computer needs often make it advantageous and desirable to reproduce or print originals which contain two or more colors. It is sometimes important that the copy reproduced or printed also contain two colors.

Several useful methods are known for making copies having plural colors. Some of these methods make high quality images, however, there is need for improvements. In particular, it is desirable to be able to print images having two or more highlight colors rather than being limited to a single highlight color. It is also desirable to be able to produce such images in a single pass of the photoreceptor or other charge retentive surface past the printing process areas or stations.

One method of producing images in plural (i.e. two colors, black and one highlight color) is disclosed in U.S. Pat. No. 3,013,890 to W. E. Bixby in which a charge pattern of either a positive or negative polarity is developed by a single, two-colored developer. The developer comprises a single carrier which supports both triboelectrically relatively positive and relatively negative toner. The positive toner is a first color and the negative toner is of a second color. The method develops positively charged image areas with the negative toner and develops negatively charged image areas with the positive toner. A two-color image occurs only when the charge pattern includes both positive and negative polarities.

Plural color development of charge patterns can be created by the method disclosed by F. A. Schwertz in U.S. Pat. No. 3,045,644. Charge patterns are developed of both a positive and negative polarity. The development system is a set of magnetic brushes, one of which applies relatively positive toner of a first color to the negatively charged areas of the charge pattern and the other of which applies relatively negative toner to the positively charged areas.

U.S. Pat. No. 3,816,115 to R. W. Gundlach and L. F. Bean discloses a method for forming a charge pattern having charged areas of a higher and lower strength of the same polarity. The charge pattern is produced by repetitively charging and imagewise exposing an overcoated xerographic plate to form a composite charge pattern.

As disclosed in U.S. Pat. No. 4,403,848, a multi-color printer uses an additive color process to provide either partial or full color copies. Multiple scanning beams, each modulated in accordance with distinct color image signals, are scanned across the printer's photoreceptor at relatively widely separated points, there being buffer means provided to control timing of the different color image signals to assure registration of the color images with one another. Each color image is developed prior to scanning of the photoreceptor by the next succeeding beam. Following developing of the last color image, the composite color image is transferred to a copy sheet. In an alternate embodiment, an input section for scanning color originals is provided. The color image signals output by the input section may then be used by the printing section to make full color copies of the original.

In tri-level, highlight color imaging, unlike conventional xerography as well as other printing processes, the image area contains three voltage levels which correspond to two image areas and to a background voltage area. One of the image areas corresponds to non-discharged (i.e. charged) areas of the photoreceptor while the other image areas correspond to discharged areas of the photoreceptor. These three voltage levels can be developed to print, for example, black, white, and a single color.

The concept of tri-level, highlight color xerography is described in U.S. Pat. No. 4,078,929 issued in the name of Gundlach. This patent teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

In highlight color xerography as taught by the Gundlach patent, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged-area development, i.e. CAD) stays at the full photoreceptor potential (V cad). The other image is exposed to discharge the photoreceptor to its residual potential, i.e. V dad (typically 100 v) which corresponds to discharged area images that are subsequently developed by discharged-area development (DAD) and the background areas exposed such as to reduce the photoreceptor potential to halfway between the V cad and V dad potentials, (typically 500 v) and is referred to as V white. The CAD developer is typically biased about 100 v closer to V cad than V white (about 600 v), and the DAD developer system is biased about 100 v closer to V dad than V white (about 400 v).

It is an object of this invention to provide a dual wavelength beam laser source for a single polygon, single optics, ROS for use in a single pass color xerographic unit.

It is another object of this invention to provide a dual wavelength sensitive, dual layer photoreceptor for use with a single polygon, single optics, ROS in a single pass color xerographic unit.

It is yet another object of this invention to provide a single pass three color xerographic printing system using a single imaging station.

It is another object of this invention to provide a dual wavelength xerographic printing system without the need for beam splitters or beam separation.

SUMMARY OF THE INVENTION

In accordance with the present invention, a single pass color xerographic printing system with a single polygon, single optical system Raster Output Scanning (ROS) system has a dual wavelength laser diode source for the ROS which images the dual beams at a single station as closely spaced spots on a dual layer photoreceptor with each photoreceptor layer sensitive to only one of the two wavelengths or each accessible to only one of the two wavelengths. Each layer of the photoreceptor is independently addressable and dischargeable by one of the two wavelengths of the laser diode light source. The laser diode light source may be either hybrid or monolithic. Alternate light sources which allow two wavelength laser beams to pass through the same single optics ROS may also be used. The light source may consist of one or more modulated beams at each of the two wavelengths. After exposure each of the resultant voltage levels on the photoreceptor is then developed with a different toner at successive development stations by appropriate choice of toner polarity and development biasing techniques. The ability to independently discharge each layer in the photoreceptor on imaging and to effect imagewise discharge by blanket exposure between development steps allows a 3-color image to be made at high speed in a single pass.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
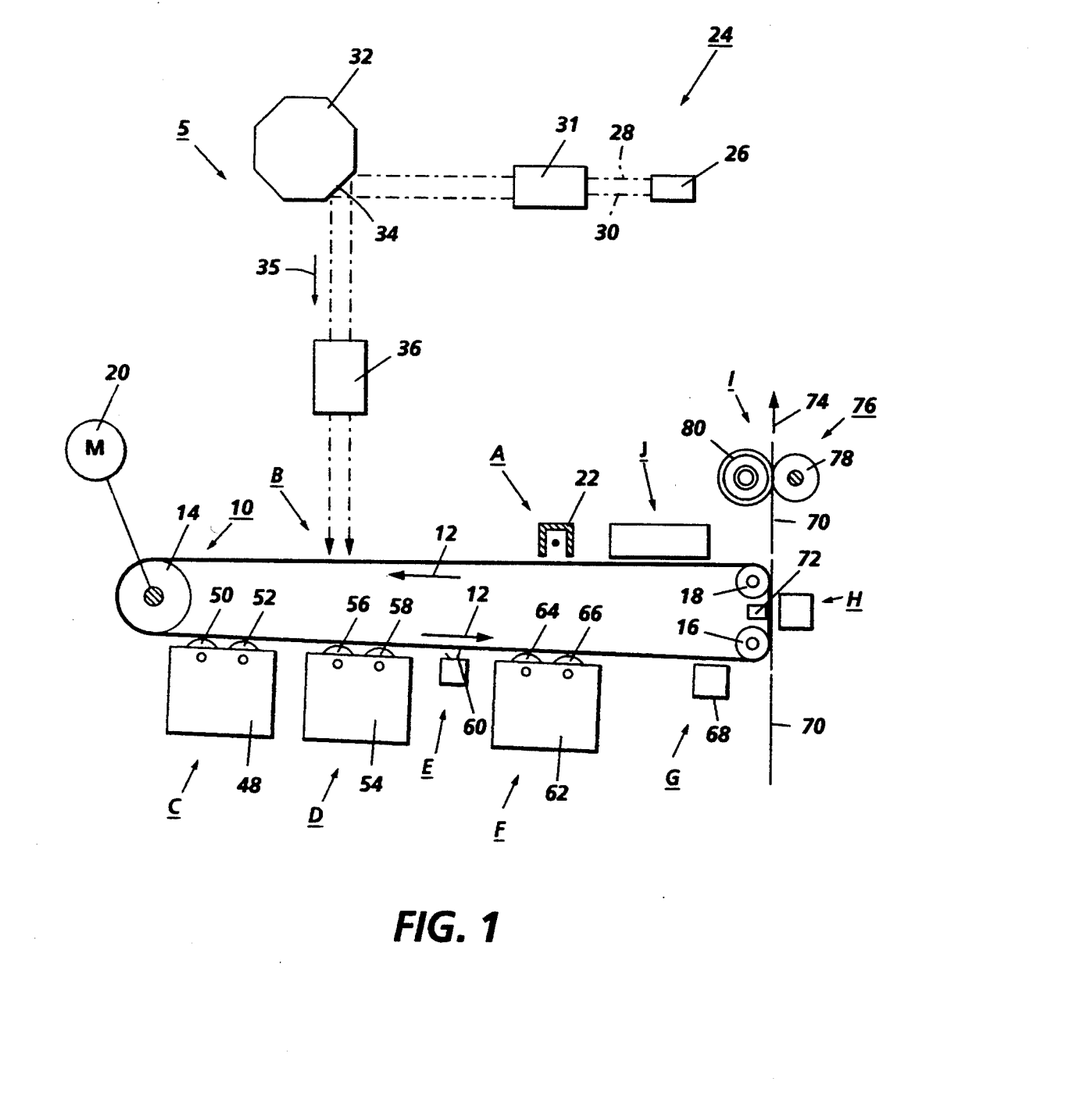
FIG. 1 is a schematic illustration of the cross-section side view of the xerographic printing system.

Reference is now made to FIG. 1, wherein there is illustrated a xerographic printing system 5 incorporating the invention which may utilize a charge retentive member in the form of a photoconductive belt 10 consisting of a photoconductive surface and an electrically conductive substrate and mounted for movement past a charging station A, an exposure station B, a first development station C, a second development station D, a uniform exposure station E, a third development station F, a pre-transfer charging station G, a transfer station H, a fusing station I, and a cleaning station J. Belt 10 moves in the direction of arrow 12 to advance successive portions of the belt sequentially through the various processing stations disposed about the path of movement thereof for forming images in a single pass of the belt through all of the process stations. Belt 10 is entrained about a plurality of rollers 14, 16 and 18, the former of which can be used as a drive roller and the latter of which can be used to provide suitable tensioning of the photoreceptor belt 10. Motor 20 rotates roller 14 to advance the belt 10 in the direction of arrow 12. Roller 14 is coupled to motor 20 by suitable means such as a belt drive.

As can be seen by further reference to FIG. 1, initially successive portions of belt 10 pass through charging station A, where a corona discharge device such as a scorotron, corotron, or dicorotron, indicated generally by the reference numeral 22, charges the belt 10 to a selectively high uniform positive or negative potential, $V_0$. Any suitable control circuit, as well known in the art, may be employed for controlling the corona discharge device 22.

Next, the charged portions of the photoreceptor surface are advanced through exposure station B. At exposure station B, the uniformly charged photoreceptor or charge retentive surface 10 is exposed to a raster output scanning device 24 which causes the charge retentive surface to remain charged or to be discharged in accordance with the output from the scanning device. An electronic subsystem converts a previously stored image into the appropriate control signals for the ROS in an imagewise fashion.

Figure 2:
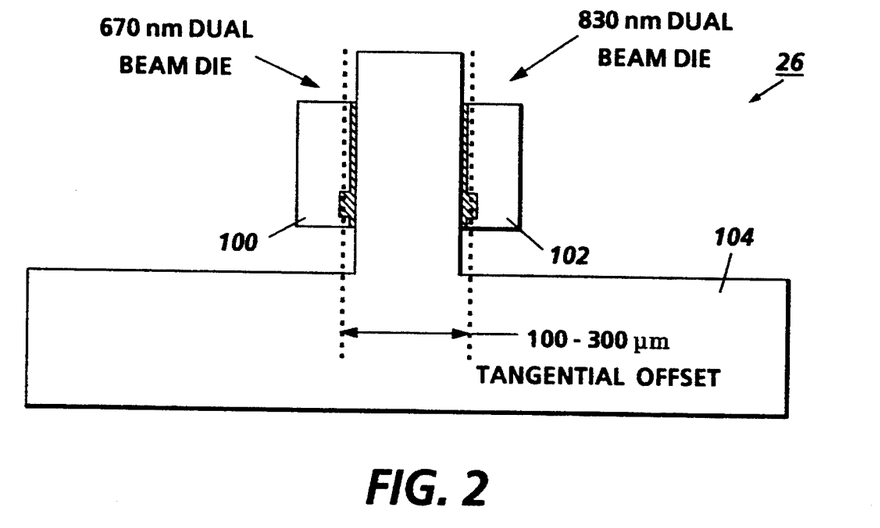
FIG. 2 is a schematic illustration of the cross-section side view of a dual wavelength laser source for the xerographic printing system of FIG. 1 formed according to the present invention.

Referring to FIG. 2, the raster output scanner 24 can use a dual wavelength hybrid laser semiconductor structure 26 consisting of a 670 nm wavelength laser emitter 100 such as a semiconductor structure of AlGaInP/GaAs and a 830 nm laser emitter 102 such as a semiconductor structure of AlGaAs/GaAs, both laser emitter structures being known to those of ordinary skill in the art.

The different wavelength beams must be scanned over on top of each other on the photoreceptor to maintain registration and avoid misalignment. The tangential offset, as indicated in FIG. 2, is given an upper limit of 300 $\mu$m since tangential offset does not introduce scan line bow. The effect of tangential offset is to require delay in the electronic modulation signals to one of the dual beams relative to the other since one beam lags the other during scanning across the photoreceptor.

In addition to the laser emitter die orientation, a possible submount configuration is also shown in FIG. 2.

The inverted T submount 104 can be readily cut from Si. Submounts of this type are currently being made and tested. With p-side down mounting the tangential offset is controlled by the width of the T. Sagittal offset can be controlled by aligning the dies vertically, for example by aligning the top edges of the dies with the top of the inverted T. One or more beams can be emitted at each wavelength. FIG. 2 shows two laser stripes and thence two beams being emitted at each of the two wavelengths.

The dual wavelength laser structure provides a substantially common spatial origin for each beam. Each beam is independently modulated so that it exposes its associated photoreceptor in accordance with a respective color image.

Referring to the raster output scanner of FIG. 1, the two laser beams 28 and 30 from the laser structure 26 are input to a conventional beam input optical system 31 which collimates, conditions and focuses the beams onto an optical path such that they illuminate a rotating polygon mirror 32 having a plurality of facets 34. As the polygon mirror rotates, the facets cause the reflected beam to deflect repeatedly in the direction indicated by the arrow 35. The deflected laser beams are input to a single set of imaging and correction optics 36, which corrects for errors such as polygon angle error and wobble and focuses the beams onto the photoreceptor belt.

As stated earlier, at exposure station B, the uniformly charged photoreceptor or charge retentive surface 10 is exposed to a raster output scanning device 24 which causes the charge retentive surface to remain charged or to be discharged in accordance with the output from the scanning device.

Figure 3:
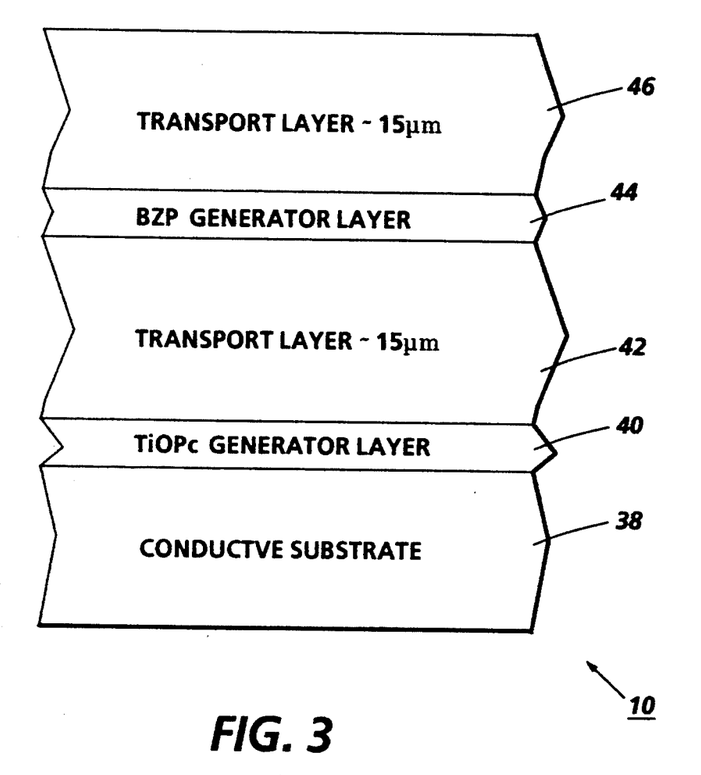
FIG. 3 is a schematic illustration of the cross-section side view of the dual layer photoreceptor belt for the xerographic printing system of FIG. 1 formed according to the present invention.

The photoreceptor belt 10 as shown in FIG. 3 consists of a flexible electrically conductive substrate 38. The substrate can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallized plastic, such as titanized or aluminized Mylar ® polyester, wherein the metallized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range. The photoreceptor layers themselves may consist of two or more sublayers. Each photoreceptor layer in FIG. 3 consists of two sublayers, i.e. a charge generation layer and a charge transport layer.

Upon the substrate is a titanyl phthalocyanine (TiOPc) first or lower generator layer 40 of approximately 0.1 to 1 $\mu$m thickness, a first or lower transport layer 42 of N,N'-dipheny-N,N'-bis(3''-methylphenyl)-(1,1'-biphenyl)-4,4'-diamine in polycarbonate (m-TPO) which is hole transporting and approximately 15 $\mu$m thick, a benzimidazole perylene (BZP) second or upper generator layer 44 of approximately 0.1 to 1 μm thickness, a second or upper transport layer 46 of m-TPO in polycarbonate which is hole transporting and approximately 15 μm thick.

The TiOPc generator layer should be thin enough to maintain low dark decay and the BZP generator layer should be thick enough to be opaque to the wavelength used to discharge it. BZP is known to be coatable to opaque thicknesses while maintaining low dark decay.

For this illustrative example, the first generator layer is infrared sensitive and the second generator layer is red sensitive and the two wavelengths of the dual wavelength laser source are in the red (at 670 nm) and the infrared (at 830 nm). The general requirement is that each generator layer is sensitive to only one of the two different wavelengths of the laser source but not sensitive to the other wavelength or each generator layer can only be accessed by one of the two wavelengths.

In this illustrative embodiment, examples of suitable red light sensitive pigments include perylene pigments such as dibromoanthranthrone, crystalline trigonal selenium, beta-metal free phthalocyanine, azo pigments, and the like, as well as mixtures thereof. Examples of suitable infrared sensitive pigments include X-metal free phthalocyanine, metal phthalocyanines such as vanadyl phthalocyanine, chloroindium phthalocyanine, chloroaluminum phthalocyanine, copper phthalocyanine, magnesium phthalocyanine, and the like, squaraines, such as hydroxy squaraine, and the like as well as mixtures thereof. Examples of suitable charge transport materials include diamine molecules, pyrazoline molecules, substituted fluorene molecules, oxadiazole molecules, hydrazone molecules, carbazole phenyl hydrazone molecules, vinyl-aromatic polymers, oxadiazole derivatives, tri-substituted methanes, and 9-fluorenylidene methane derivatives.

The generator and transport layers can be deposited or vacuum evaporated or solvent coated upon the substrate by means known to those of ordinary skill in the art.

Figure 4:
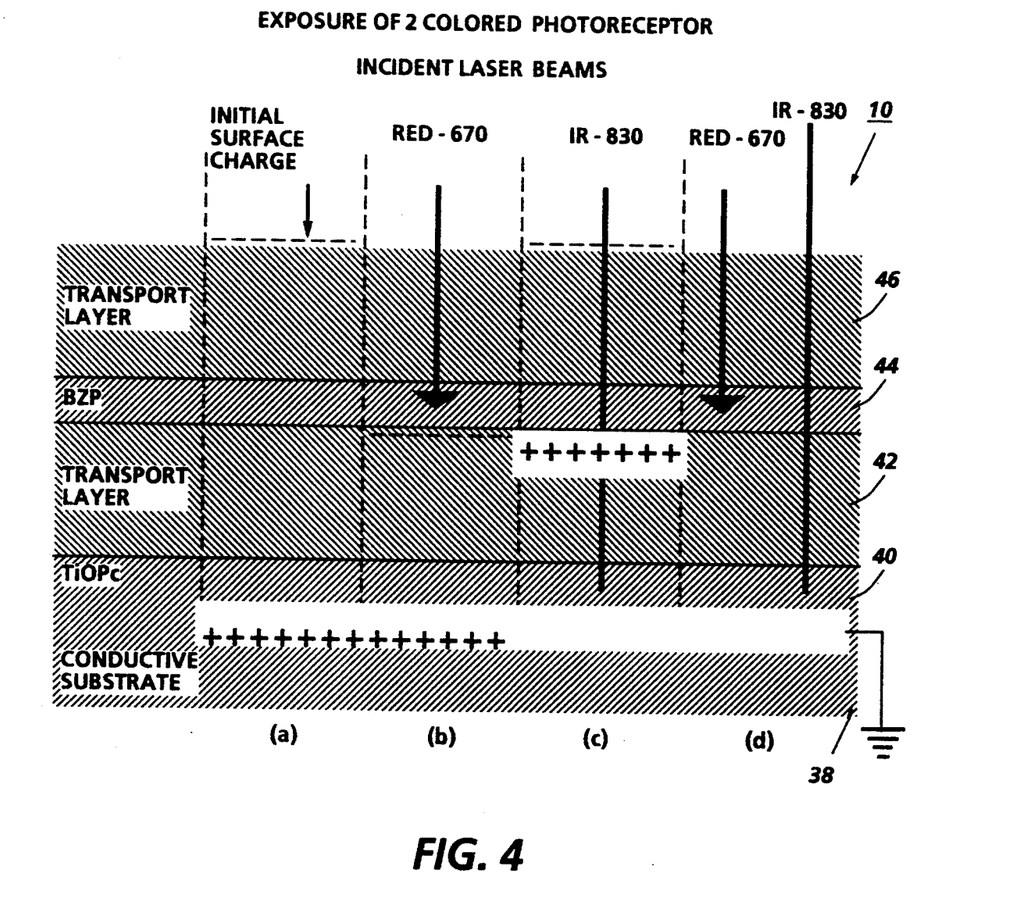
FIG. 4 is a schematic illustration of the cross-section side view of the exposure of the dual layer photoreceptor belt for the xerographic printing system of FIG. 1 formed according to the present invention.

During exposure from the light beams from the raster output scanner within the photoreceptor belt as shown in FIG. 4, the 670 nm wavelength of one modulated beam would be entirely absorbed in the opaque BZP generator layer. Exposure with the 670 nm beam would therefore discharge the BZP and upper transport layer. None of the 670 nm light beam would reach the TiOPc layer so that the TiOPc and lower transport layer would remain fully charged. The second wavelength is chosen to be 830 nm to insure that it will pass completely throught the BZP layer without effecting any discharge of the BZP or upper transport layer. However, the TiOPc layer is very sensitive to 830 nm and exposure with this wavelength from a modulated beam will discharge the TiOPc layer and the lower transport layer. However, the 830 nm exposure should not be allowed to effect discharge through the BZP layer and the upper transport layer.

Figure 5:
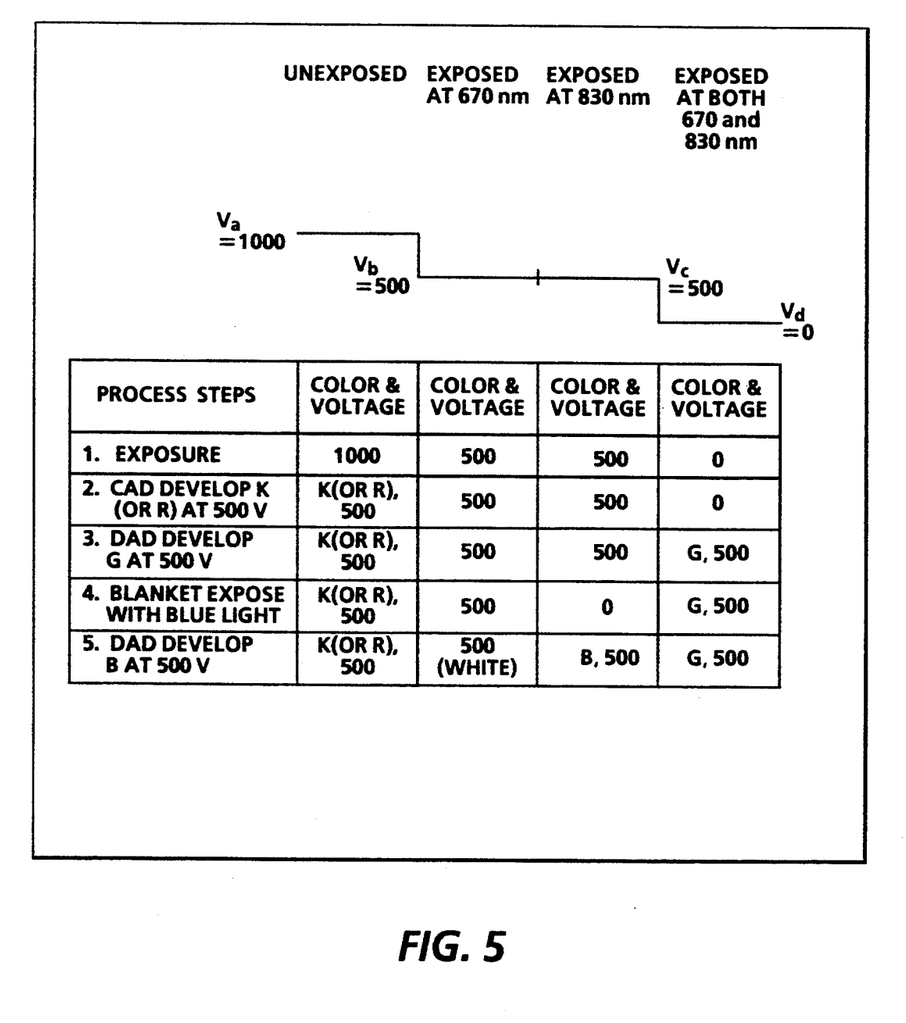
FIG. 5 is a schematic illustration of the development of the dual layer photoreceptor belt for the xerographic printing system of FIG. 1 formed according to the present invention.

The details of the imaging process to expose the 3-color image in a single pass of the photoreceptor belt are shown in FIG. 4. There are four resultant areas on the photoreceptor: (a) the unexposed areas which retain the original surface voltage, (b) the areas exposed with 670 nm which are discharged to roughly one-half of the original surface voltage, (c) the areas exposed with 830 nm which are also discharged to roughly one-half of the original surface voltage, and (d) the areas exposed with both 830 and 670 nm which are fully discharged. While only three voltage levels are present on the photoreceptor at this stage immediately after exposure, there will be four distinctly different areas on the photoreceptor after xerographic development as shown in FIG. 5. While the surface voltages in regions (b) and (c) are roughly equal after exposure they have been formed in very distinct ways. During the development process the photoreceptor will remember how these voltages were formed to allow development in very different ways in the two regions.

The steps in the three color plus white development process of the embodiment in FIG. 5 are: first, exposure of the photoreceptor belt to the two modulated laser beams of different wavelengths; second, CAD development with black toner at 500 volts; third, DAD development with green toner at 500 volts; fourth, blanket exposure of the photoreceptor belt with blue light; and fifth, DAD development with blue toner at 500 volts.

At development station C, a development system, indicated generally by the reference numeral 48, advances developer materials into contact with the CAD electrostatic latent images. The development system 48 comprises a developer housing. The developer housing 48 contains a pair of magnetic brush rollers 50 and 52. The rollers advance developer material into contact with the photoreceptor 10 for developing the charged-area regions ($V_{CAD}$). The developer material, by way of example, contains black toner which will be positively charged for a negatively charged photoreceptor. The black toner is applied to the latent electrostatic images contained on the photoconductive surface 10 via magnetic brush rollers, the carrier of this two component developer being selected such that the black toner is positively charged through triboelectric charging thereagainst. Electrical biasing is accomplished via power supply, electrically connected to the developer apparatus. A suitable DC bias volts is applied to the rollers 50 and 52 and the developer housing 48 via the power supply.

At development station D, a development system, indicated generally by the reference numeral 54, advances developer materials into contact with the DAD electrostatic latent images. The development system 54 comprises a developer housing. The developer housing 54 contains a pair of magnetic rolls 56 and 58. The rollers advance developer material into contact with the photoreceptor for developing the discharged-area regions ($V_{DAD}$). The developer material, by way of example, contains green toner which will be negatively charged for a negatively charged photoreceptor. Appropriate electrical biasing is accomplished via power supply electrically connected to the developer apparatus. A suitable DC bias is applied to the rollers 56 and 58 and to the developer housing 56 via the bias power supply.

The details of the xerographic process to develop the 3-color image in a single pass are shown in FIG. 5. For convenience, the 3 voltage levels after exposure are assumed to be 1000 V, 500 V and 0 V. CAD development at the first development housing at a bias of 500 V is used to deposit black (K) (or red (R)) toner in the unexposed (a) regions. DAD development at the second development housing at a bias of 500 V is used to deposit green (G) toner in the fully exposed (d) regions.

The condition of the photoconductor after these first two steps of development is that the developed portions of the photoreceptor with deposited color toners will now have voltage levels approximately equal to the respective developer housing bias levels as the result of using a development system such as Conductive Magnetic Brush (CMB) development since the primary development mechanism is charge neutralization.

Next, a non-imagewise uniform blanket exposure of blue light is applied to the photoreceptor at uniform exposure station E with a well controlled light source such as a fluorescent lamp 60, as shown in FIG. 1. The areas of the photoreceptor that have already been developed with black and green toners, are shielded from the light by the deposited toner, so, little or no discharge occurs in these areas. The emission spectrum of the lamp, if necessary, could be tuned relative to the absorption spectra of the toners to fully insure that discharge beneath the toner does not take place.

As seen in FIG. 5, blanket exposure with blue light will leave the unexposed region (a) unaffected since the black toner should prevent exposure of the underlying photoreceptor. The white or 670 nm exposed (b) regions should also be unaffected since the BZP layer will absorb all of the blue light before it gets to the TiOPc layer. However, absorption in the BZP will not affect the surface voltage since the top half of the photoreceptor has already been discharged by exposure to 670 nm in the white (b) regions. Since the 830 nm exposed (c) regions have not yet seen blue light, the top half of the photoreceptor will be discharged by this blanket blue exposure to put these regions in a fully discharged state. This is how the photoreceptor remembers its previous history and a blanket exposure with blue light separates the voltages in the 670 nm exposed (b) and the 830 nm exposed (c) regions. Since the fully exposed (d) regions are shielded by green toner, the blanket exposure with blue light has no effect there.

Returning to FIG. 1, at development station F, a development system, indicated generally by the reference numeral 62, advances developer materials into contact with the DAD electrostatic latent images. The development system 62 comprises a developer housing. DAD development at the third developer housing at 500 V is used to deposit blue (B) toner on the 830 nm exposed (c) regions. The developer housing 62 contains a pair of magnetic rolls 64 and 66. The rollers advance developer material into contact with the photoreceptor for developing the discharged-area regions ($V_{DAD}$). The developer material contains blue toner which will be negatively charged for a negatively charged photoreceptor. Appropriate electrical biasing is accomplished via power supply electrically connected to the developer apparatus. A suitable DC bias is applied to the rollers 64 and 66 and to the developer housing 62 via the bias power supply.

The only general requirement for the blanket exposure station and the DAD third development housing is that the wavelength of the blanket exposure light should not penetrate the already toned regions and should discharge only one of the two already partially discharged regions and the color toner deposited by the third development housing should be different from the color toners used in the first two developer housings.

Thus the development process produces three colors plus white in the final print. In principle any three colors of toner can be used as long as the first two colors have good absorption of the light in the subsequent blanket exposure step to prevent discharge of the underlying photoreceptor in these regions.

Because the composite image developed on the photoreceptor consists of both positive and negative toner, a typically positive pre-transfer corona charging member 68, disposed at pre-transfer charging station G, is provided to condition the toner for effective transfer to a substrate using positive corona charge. The pre-transfer corona charging member is preferably an AC corona device biased with a DC voltage to operate in a field sensitive mode and to perform tri-level xerography pre-transfer charging in a way that selectively adds more charge (or at least comparable charge) to the parts of the image that must have their polarity reversed. This charge discrimination may be enhanced by discharging the photoreceptor carrying the composite developed latent image with light before the pre-transfer charging begins. Furthermore, flooding the photoreceptor with light coincident with the pre-transfer charging minimizes the tendency to overcharge portions of the image which are already at the correct polarity.

A sheet of support material 70 is moved into contact with the toner image at transfer station H. The sheet of support material is advanced to transfer station H by a conventional sheet feeding apparatus, not shown. Preferably, the sheet feeding apparatus includes a feed roll contacting the uppermost sheet of a stack copy sheets. Feed rolls rotate to advance the uppermost sheet from stack into a chute which directs the advancing sheet of support material into contact with photoconductive surface of belt 10 in a timed sequence, so that the developed toner powder image contacts the advancing sheet of support material at transfer station H.

Transfer station H includes a corona generating device 72 which sprays ions of a suitable polarity onto the backside of sheet 70. This attracts the charged toner powder images from the belt 10 to sheet 70. After transfer, the sheet continues to move, in the direction of arrow 74, onto a conveyor (not shown) which advances the sheet to fusing station I.

Fusing station I includes a fuser assembly, indicated generally by the reference numeral 76, which permanently affixes the transferred powder image to sheet 70. Preferably, fuser assembly 76 comprises a heated fuser roller 78 and a backup roller 80. Sheet 68 passes between fuser roller 78 and backup roller 80 with the toner powder image contacting fuser roller 78. In this manner, the toner powder image is permanently affixed to sheet 70. After fusing, a chute, not shown, guides the advancing sheet 70 to a catch tray, also not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station J. A magnetic brush cleaner housing is disposed at the cleaner station J. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining prior to the charging thereof for the successive imaging cycle.

The use of a dual beam light source with the two emitted beams sharing the same optical elements in the raster output scanner optical system provides improved pixel placement accuracy upon the photoreceptor belt since common polygon optics are used. Sharing the optical elements also reduces the physical size, the number of optical elements and the costs of the ROS. However, the sharing of optical elements by the dual beams is merely an illustrative example of the xerographic printing system. Each beam could have a separate ROS optical system or just share certain ROS optical elements, like the facet of the rotating polygon mirror.

The specific wavelengths and voltages used in the present application are merely illustrative examples. The actual wavelengths or actual voltages may be different or may be within a range of wavelengths or voltages.

The photoreceptor belt of the present invention can, in the alternative, be a drum photoreceptor or other equivalents.

As will be appreciated by those skilled in the art, while conductive magnetic brush development has been disclosed in order to take advantage of its inherent charge neutralization properties, any scavengeless or non-interactive development may be employed.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A xerographic printing system comprising:
   a raster output scanner optical system for generating at least one first modulated beam at a first wavelength and at least one second modulated beam at a second wavelength, said second wavelength being different from said first wavelength,
   a photoreceptor means having a first layer upon a second layer, said second layer being upon a flexible substrate, said first layer being sensitive only to said first wavelength and said second layer being sensitive and accessible only to said second wavelength, and
   xerographic means, said xerographic means comprising a charging station for charging said photoreceptor means, at least one exposure station for then exposing areas of said photoreceptor means to one of the following neither said first modulated beam and said second modulated beam, said first modulated beam, said second modulated beam, and both said first modulated beam and said second modulated beam, and, after exposure, a plurality of development stations for depositing three different toners on said photoreceptor means in response to exposure of said areas of said layers to said modulated beams.

2. The xerographic printing system of claim 1 wherein said photoreceptor means comprises a photoreceptor belt, said photoreceptor belt having an electrically conductive substrate upon which is said second layer and said first layer.

3. The xerographic printing system of claim 1 wherein said first layer is sensitive in the red range and said second layer is sensitive in the infrared range.

4. The xerographic printing system of claim 2 wherein said first layer consists of benzimidazole perylene (BZP), and said second layer consists of titanyl phthalocyanine(TiOPc).

5. The xerographic printing system of claim 4 wherein said first layer comprises a generator layer of benzimidazole perylene (BZP) and a transport layer of N,N'-diphenyl-N,N'-bis(3''-methylphenyl)-(1,1'-biphenyl)-4,4'-diamine (m-TPO in polycarbonate) and said second layer comprises a generator layer of titanyl phthalocyanine(TiOPc) and a transport layer of N,N'-diphenyl-N,N'-bis(3''-methylphenyl)-(1,1'-biphenyl)-4,4'-diamine (m-TPO in polycarbonate).

6. The xerographic printing system of claim 5 wherein said generator layer of BZP of said first layer is approximately 0.1 to 1 μm thick, said transport layer of m-TPO in polycarbonate of said first layer is approximately 15 μm thick, said generator layer of TiOPc of said second layer is approximately 0.1 to 1 μm thick and said transport layer of m-TPO in polycarbonate of said second layer is approximately 15 μm thick.

7. The xerographic printing system of claim 6 wherein said first wavelength is approximately 670 nm and said second wavelength is approximately 830 nm.

8. The xerographic printing system of claim 1 wherein said first wavelength is approximately 670 nm and said second wavelength is approximately 830 nm.

9. The xerographic printing system of claim 1 wherein said raster output scanner optical system comprises a single rotating polygon and single optical system for said first and second modulated beams.

10. The xerographic printing system of claim 1 wherein a blanket exposure step is used between toner development stations to change voltage levels between said areas of said photoreceptor which were exposed to said first modulated beam only and said areas of said photoreceptor which were exposed to said second modulated beams only to allow subsequent toner development in only one of said areas.

11. The xerographic printing system of claim 1 wherein the light source of said raster output scanner optical system comprises a semiconductor laser for generating at least one first beam at said first wavelength and for generating at least one second beam at said second wavelength.

12. The xerographic printing system of claim 1 wherein said photoreceptor means comprises a photoreceptor drum, said photoreceptor drum having an electrically conductive substrate upon which is said second layer and said first layer.

13. A xerographic printing system comprising:
   a raster output scanner optical system for generating at least one first modulated beam at a first wavelength and at least one second modulated beam at a second wavelength, said second wavelength being different from said first wavelength,
   a photoreceptor means having a first layer upon a second layer, said second layer being upon a flexible substrate, said first layer being sensitive only to said first wavelength and said second layer being sensitive only to said second wavelength, and
   xerographic means, said xerographic means comprising a charging station for charging said photoreceptor means, at least one exposure station for then exposing areas of said photoreceptor means to one of the following neither said first modulated beam and said second modulated beam, said first modulated beam, said second modulated beam, and both said first modulated beam and said second modulated beam, and, after exposure, a plurality of development stations for depositing three different toners on said photoreceptor means in response to exposure of said areas of said layers to said modulated beams.

14. The xerographic printing system of claim 13 wherein said photoreceptor means comprises a photoreceptor belt, said photoreceptor belt having an electrically conductive substrate upon which is said second layer and said first layer.

15. The xerographic printing system of claim 13 wherein said raster output scanner optical system comprises a single rotating polygon and single optical system for said first and second modulated beams.

16. The xerographic printing system of claim 13 wherein a blanket exposure step is used between toner development stations to change voltage levels between said areas of said photoreceptor which were exposed to said first modulated beam only and said areas of said photoreceptor which were exposed to said second modulated beams only to allow subsequent toner development in only one of said areas.

17. The xerographic printing system of claim 13 wherein the light source of said raster output scanner optical system comprises a semiconductor laser for generating at least one first beam at said first wavelength and for generating at least one second beam at said second wavelength.

18. The xerographic printing system of claim 13 wherein said photoreceptor means comprises a photoreceptor drum, said photoreceptor drum having an electrically conductive substrate upon which is said second layer and said first layer.

* * * * *